T. J. & G. M. CLARK.
Hay-Tedder.
No. 141,999. Patented August 19, 1873.
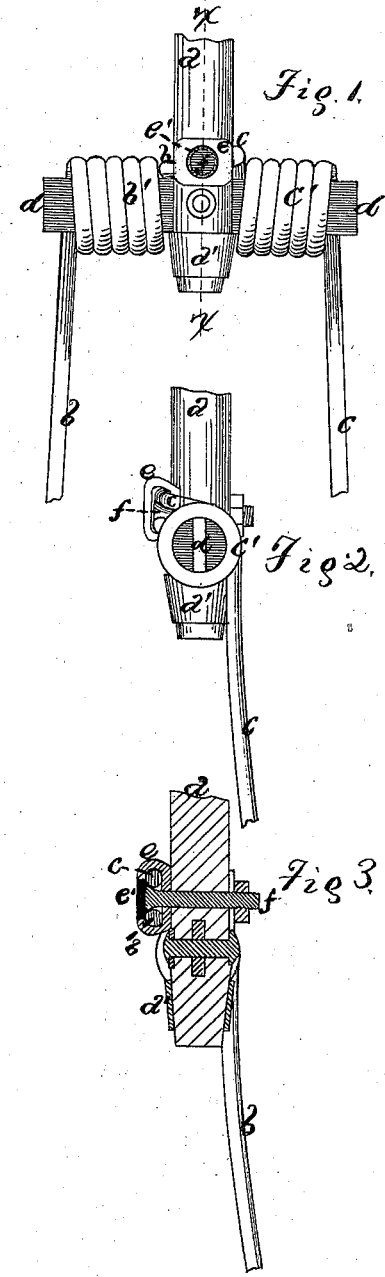

UNITED STATES PATENT OFFICE.

THOMAS J. CLARK AND GEORGE M. CLARK, OF HIGGANUM, CONNECTICUT.

IMPROVEMENT IN HAY-TEDDERS.

Specification forming part of Letters Patent No. 141,999, dated August 19, 1873; application filed March 25, 1873.

*To all whom it may concern:*

Be it known that we, THOMAS J. and GEORGE M. CLARK, of Higganum, in the county of Middlesex and State of Connecticut, have invented certain new and useful Improvements in Hay-Tedder Forks, of which the following is a specification, reference being had to the accompanying drawings, in which—

Figure 1 is a view of the back or under side of the fork-handle with the tines of the fork attached. Fig. 2 is a side view of the parts shown in Fig. 1. Fig. 3 is a view of the same in section through the dotted line $x\ x$.

The letter $a$ indicates the handle of the fork, commonly made of wood, which is operated by the machinery of the tedder, having upon it the ferrule $a'$ to keep it from splitting. The tines $b\ c$ are each made of a piece of spring wire, having a coil, $b'\ c'$, running around the cross-piece $d$, then under the handle $a$, entering into the sleeve $e$, which is open at the ends, and has a hole, $e'$, on its top for the passage of the headed bolt, pin, or screw, $f$, which runs down through a corresponding hole in the bottom of the sleeve and into or through the handle $a$. The head of the bolt $f$ is conical so as to act like a wedge, and bears upon and against the ends of the tines, which are nicked or hollowed out so as to partially embrace the bolt, and thereby secures them and the sleeve firmly to the handle. The cross-piece $d$ is permanently secured to the handle. It is made flat-sided and of spring-metal, as steel, so as to give the tines somewhat more elasticity than they would otherwise have, and thus lessen the danger of their breaking.

We claim as our invention—

The combination of the handle $a$, the sleeve $e$ open at the ends and sides, the two fork-tines, and the bolt $f$ with a conical or wedge-shaped head, the whole constructed, arranged, and designed for use, substantially as described.

THOMAS J. CLARK.
GEORGE M. CLARK.

Witnesses:
CLINTON B. DAVIS,
HENRY H. BRAINARD.